United States Patent [19]
Toyama

[11] Patent Number: 5,513,046
[45] Date of Patent: Apr. 30, 1996

[54] LARGE APERTURE RETROFOCUS LENS

[75] Inventor: Nobuaki Toyama, Saitama, Japan

[73] Assignee: Fuji Photo Optical Co., Ltd., Ohmiya, Japan

[21] Appl. No.: 255,705

[22] Filed: Jun. 7, 1994

[30]     Foreign Application Priority Data

Jun. 8, 1993  [JP]  Japan ..................... 5-137098

[51] Int. Cl.⁶ ..................................... G02B 13/04
[52] U.S. Cl. .............................. 359/752; 359/757
[58] Field of Search .................... 359/749, 750, 359/751, 752, 757

[56]           References Cited
        U.S. PATENT DOCUMENTS 4,449,793  5/1984  Nakamura et al. ............... 359/749

FOREIGN PATENT DOCUMENTS

| 59-232310 | 12/1984 | Japan . |
| 60-026919 | 2/1985 | Japan . |
| 63-081414 | 4/1988 | Japan . |
| 02085816 | 3/1990 | Japan . |

*Primary Examiner*—Georgia Y. Epps
*Assistant Examiner*—Dawn-Marie Bey
*Attorney, Agent, or Firm*—Sixbey Friedman Leedom & Ferguson; Gerald J. Ferguson, Jr.; Evan R. Smith

[57]            ABSTRACT

A large aperture retrofocus lens system is composed of first to sixth lenses arranged in this order from the object side. The first lens has a positive refracting power, the second lens has a negative refracting power, the third lens which is a meniscus lens concave toward the object side, the fourth lens has a negative refracting power, the fifth lens has a positive refracting power and the sixth lens has a positive refracting power.

10 Claims, 8 Drawing Sheets

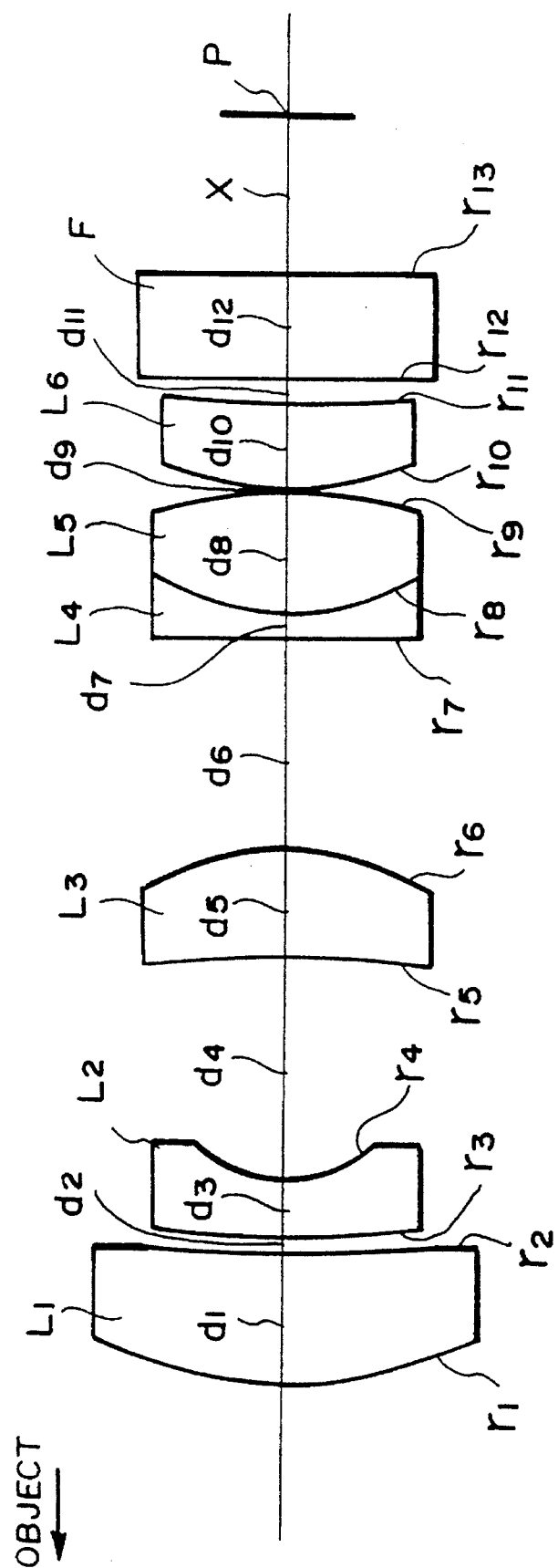

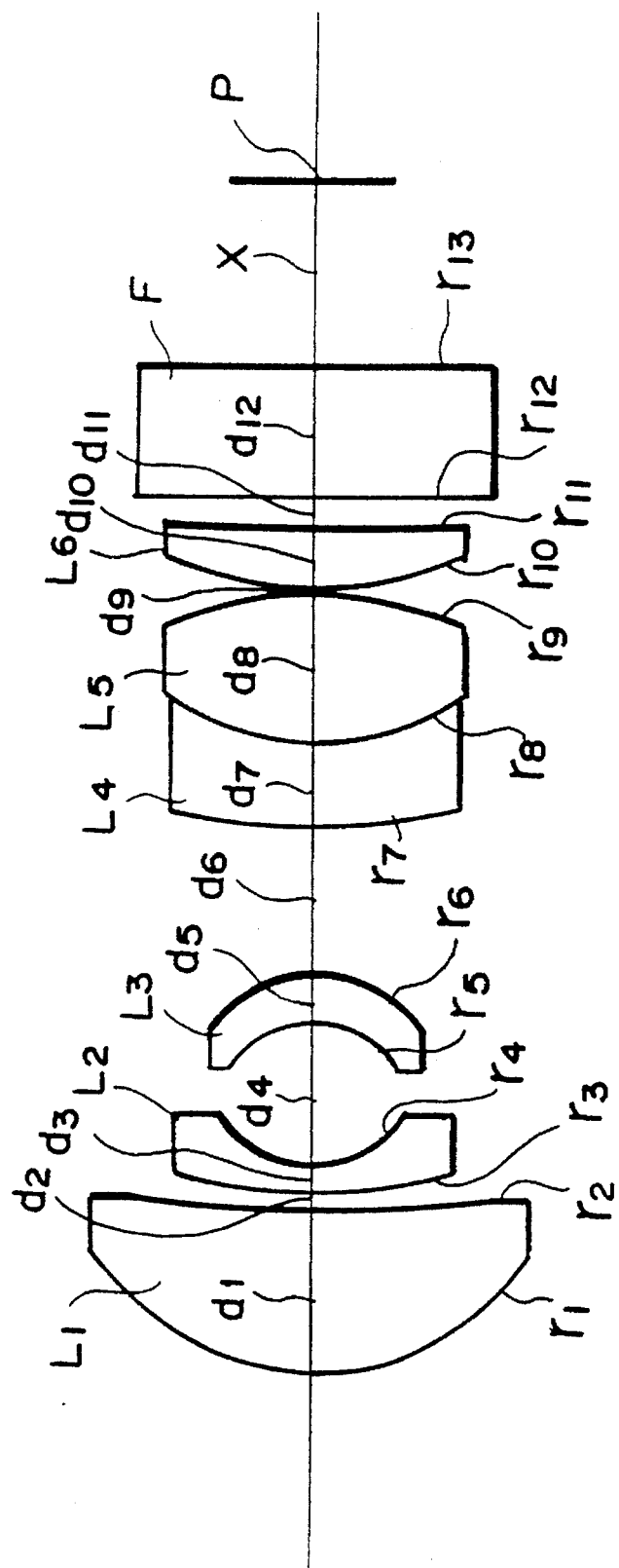

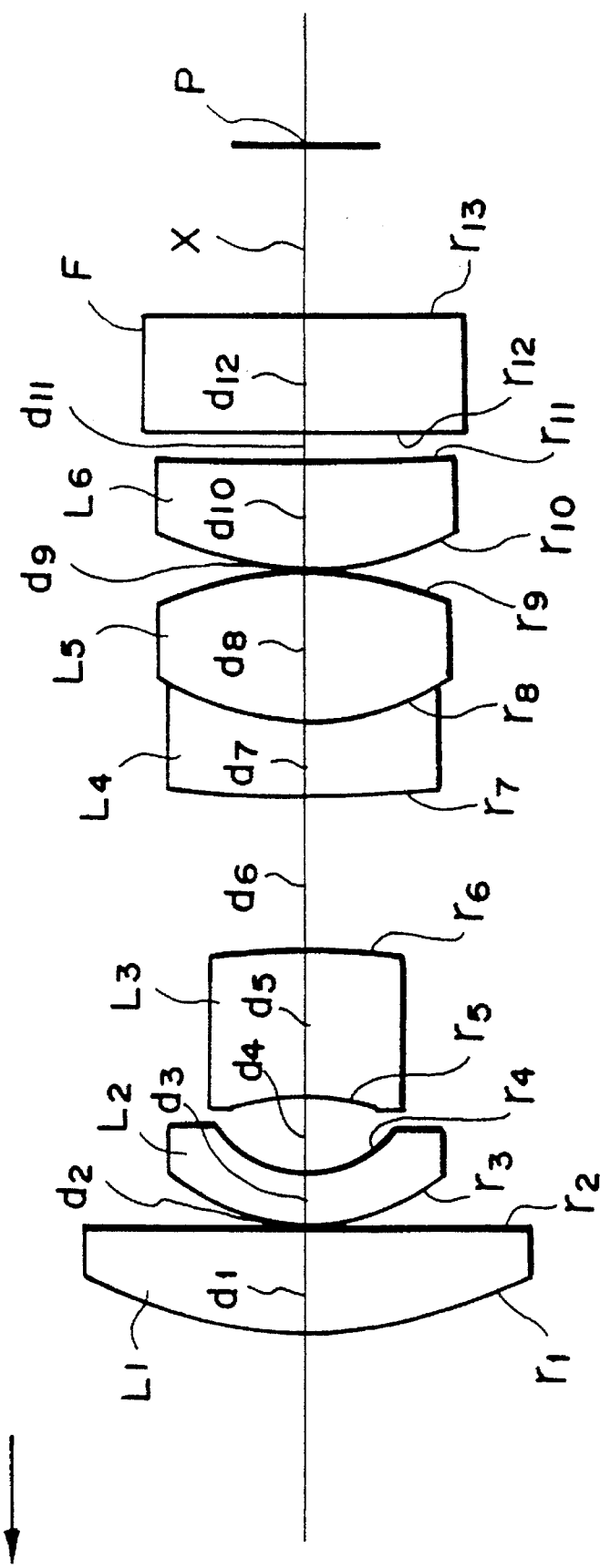

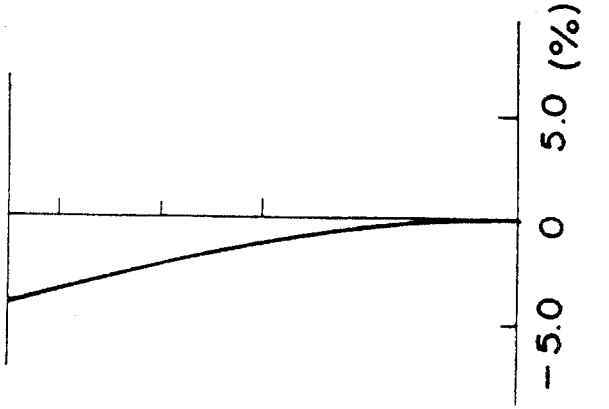
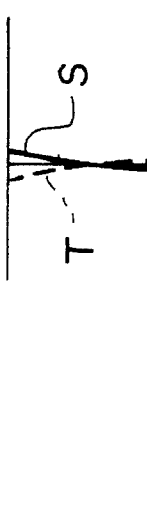

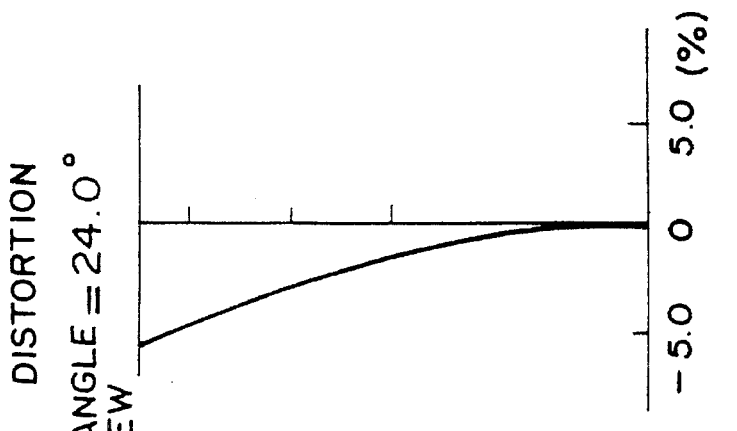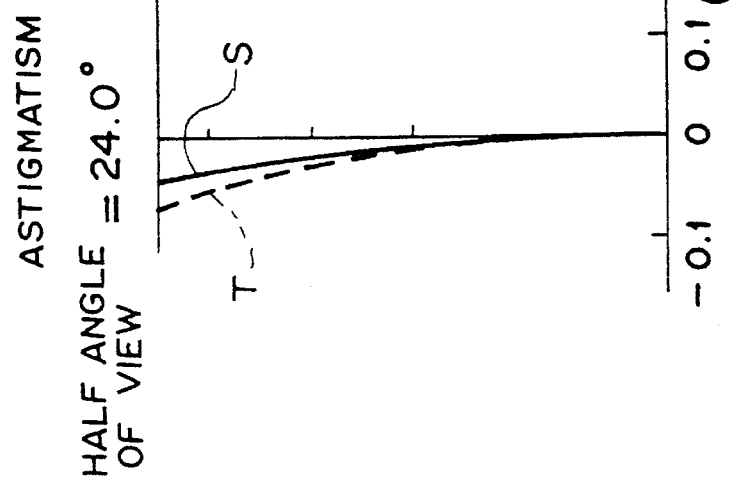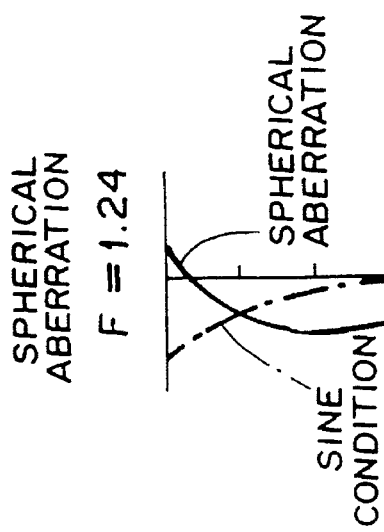

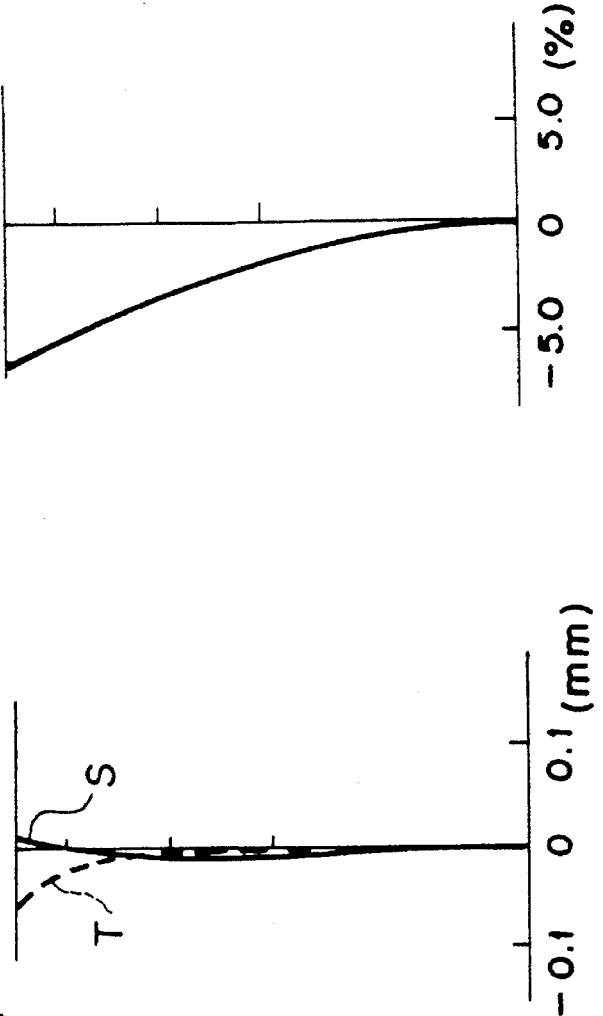
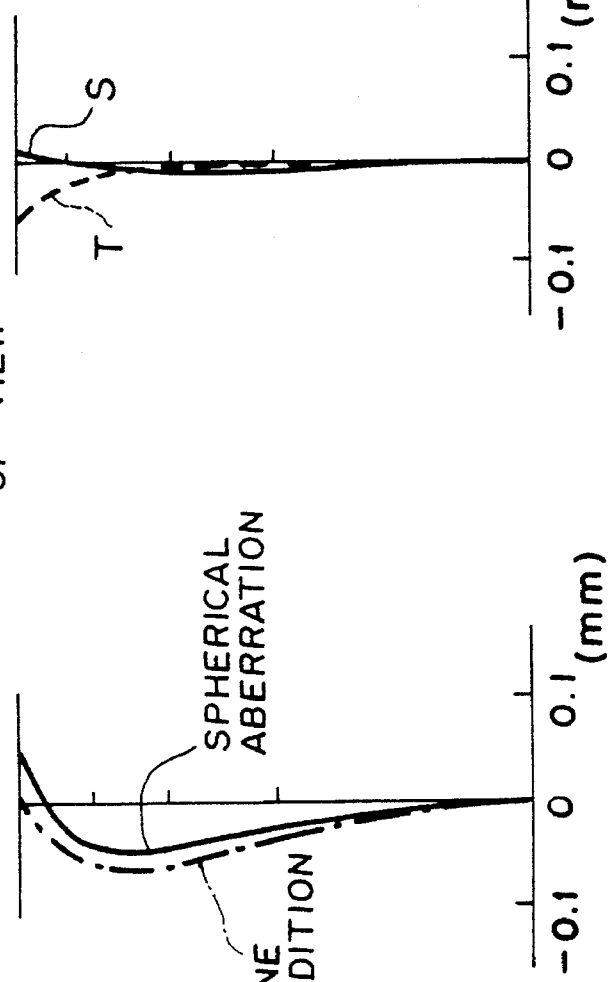
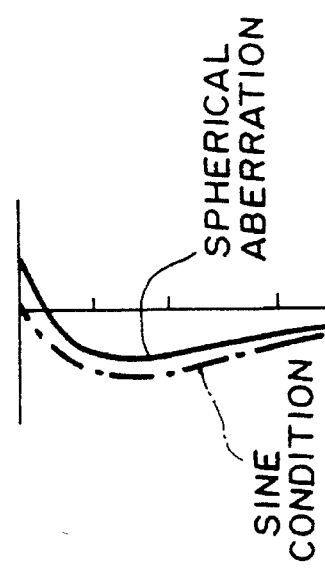

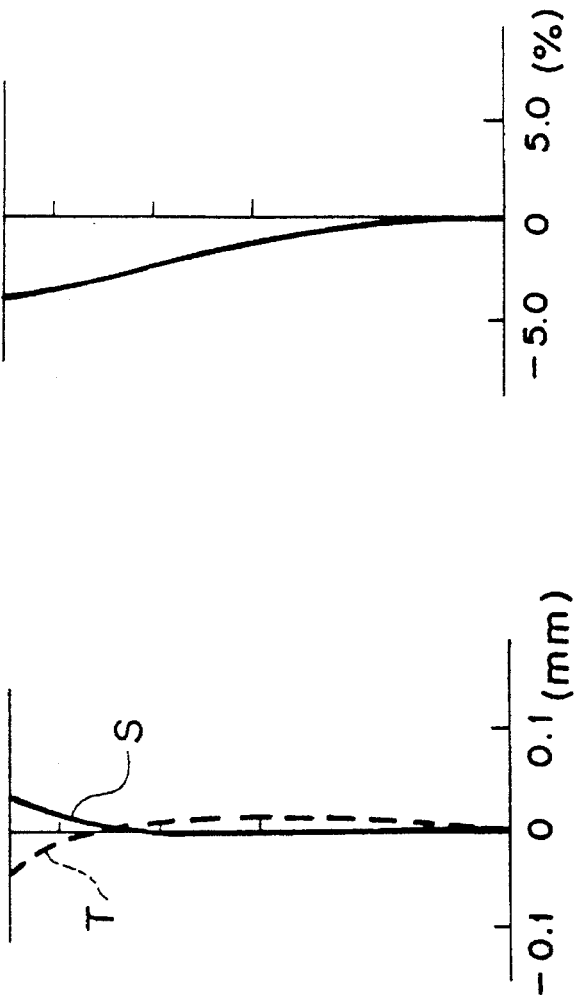

5,513,046

LARGE APERTURE RETROFOCUS LENS

BACKGROUND OF THE INVENTION

1. Field of the Invention

This invention relates to a lens system for a miniature image pickup device, and more particularly to a retrofocus lens system to be mounted on a miniature image pickup device such as a video camera using an image pickup element.

2. Description of the Prior Art

Recently, as a video camera or a still-video camera (a video camera which is also capable of taking a still photo) using a solid state image pickup element comes into wide use, demand for a retrofocus lens system which is small in size and large in aperture ratio is increasing. Especially, there is an urgent necessity of a clear retrofocus lens system having a large aperture ratio in order to meet demands for miniaturization of such image pickup devices.

Further in such a miniature image pickup device, since a lowpass filter for cutting high frequency components of light such as those of quartz plate is disposed between the lens system and the image plane, the retrofocus lens should have a long back focus.

Thus there is a demand for a large aperture retrofocus lens system which is small in size, large in aperture ratio and long in back focus.

In order to meet such a demand, there have been developed various lens systems as disclosed in Japanese Unexamined Patent Publication Nos. 63(1988)-81414, 2(1990)-85816, 60(1985)-26919, 59(1984)-232310 and the like.

However increasing the aperture ratio of a lens system (decreasing the f-number) and increasing the back focus generally conflict with each other and it has been difficult to meet both the requirements on the aperture ratio and the back focus while keeping small lens aberrations.

For example, in the lens system disclosed in Japanese Unexamined Patent Publication No. 63(1988)-81414, though the back focus can be increased up to about 1.2f, the f-number cannot be reduced below 1.65 since the spherical aberration becomes too large if the f-number is reduced up to about 1.2. In the lens system disclosed in Japanese Unexamined Patent Publication No. 2(1990)-85816, though the f-number is about 1.44 and relatively small, the angle of view is too small and the back focus is short. Further when the f-number is reduced up to about 1.2, the coma and the astigmatism deteriorate. Further in Japanese Unexamined Patent Publication No. 60(1985)-26919, there is described a lens system whose the f-number is 1.2. However in this lens system, correction of the spherical aberration, the coma and the astigmatism is not sufficient.

In the lens system disclosed in Japanese Unexamined Patent Publication No. 59(1984)-232310, the f-number can be as small as 1.2 and the back focus can be long without deteriorating the aberrations, whereby a clear lens system which permits the distance between the final lens surface and the image plane to be long.

However since, being of seven lenses, the lens system is not satisfactory from the viewpoint of reducing the lens size and lowering the manufacturing cost, and accordingly, development of a six-lens lens system having an equivalent performance has been required.

SUMMARY OF THE INVENTION

In view of the foregoing observations and description, the primary object of the present invention is to provide a large aperture retrofocus lens system which is of six lenses and in which the f-number can be about 1.2 and the back focus can be about 1.1f without deteriorating the aberrations.

In accordance with the present invention, there is provided a large aperture retrofocus lens system comprising a first lens having a positive refracting power, a second-lens having a negative refracting power a third lens which is a meniscus lens concave toward object side, a fourth lens having a negative refracting power and fifth and sixth lenses having positive refracting powers, the first to sixth lenses being second arranged in this order from the object side.

In one preferred embodiment, the large aperture retrofocus lens system satisfies the following formula $$-5.0f \leq r_5 \leq -0.3f \quad (1)$$

$$-0.75 \leq f/f_3 \leq 0.5 \quad (2)$$

wherein $r_5$ represents the radius of curvature of the object side surface of the third lens ($r_5 < 0$), $f_3$ represents the focal length of the third lens, and f represents the focal length of the overall lens system.

In another preferred embodiment of the present invention, the large aperture retrofocus lens system satisfies the following formulae.

$$30 > v_4 \quad (3)$$

$$42 ( v_5 + v_6 \quad (4)$$

$$1.65 < (n_5 n_6)/2 \quad (5)$$

wherein $n_i$ represents the refractive index of the i-th lens and $v_i$ represents the Abbe's number of the i-th lens.

In still another preferred embodiment of the present invention, the large aperture retrofocus lens system satisfies all the formulae (1) to (5).

In the retrofocus lens system of the present invention, the third lens which is a meniscus lens concave toward the object side contributes to prevention of deterioration of the spherical aberration, the curvature of field and the coma when the f-number is set to about 1.2 and the back focus is set to be not shorter than about 1.1f. Further by disposing the first lens having a positive refracting power in front of the second lens having a negative refracting power, deterioration of the distortion and the like can be prevented.

When $r_5$ and $f/f_3$ are not in the ranges respectively defined by formulae (1) and (2), the spherical aberration, the curvature of field and the coma all deteriorate.

When $v_4$ and $(v_{+v6})/2$ are not in the ranges respectively defined by formulae (3) and (4), the chromatic aberration deteriorates.

When $(n_5+n_6)/2$ is not in the range defined by formulae (5), the radius of curvature of the lens becomes too small and the spherical aberration and/or the curvature of field deteriorates.

BRIEF DESCRIPTION OF THE DRAWINGS

FIG. 2 is a schematic view showing a large aperture retrofocus lens system in accordance with a second embodiment of the present invention, FIG. 3 is a schematic view showing a large aperture retrofocus lens system in accordance with a third embodiment of the present invention, FIG. 4 is a schematic view showing a large aperture retrofocus lens system in accordance with a fourth embodiment of the present invention, FIGS. 5A to 5C respectively show spherical aberration, astigmatism and distortion of the lens system in accordance with the first embodiment, FIGS. 6A to 6C respectively show spherical aberration, astigmatism and distortion of the lens system in accordance with the second embodiment, FIGS. 7A to 7C respectively show spherical aberration, astigmatism and distortion of the lens system in accordance with the third-embodiment, and FIGS. 8A to 8C respectively show spherical aberration, astigmatism and distortion of the lens system in accordance with the fourth embodiment.

DESCRIPTION OF THE PREFERRED EMBODIMENT

Figure 1:
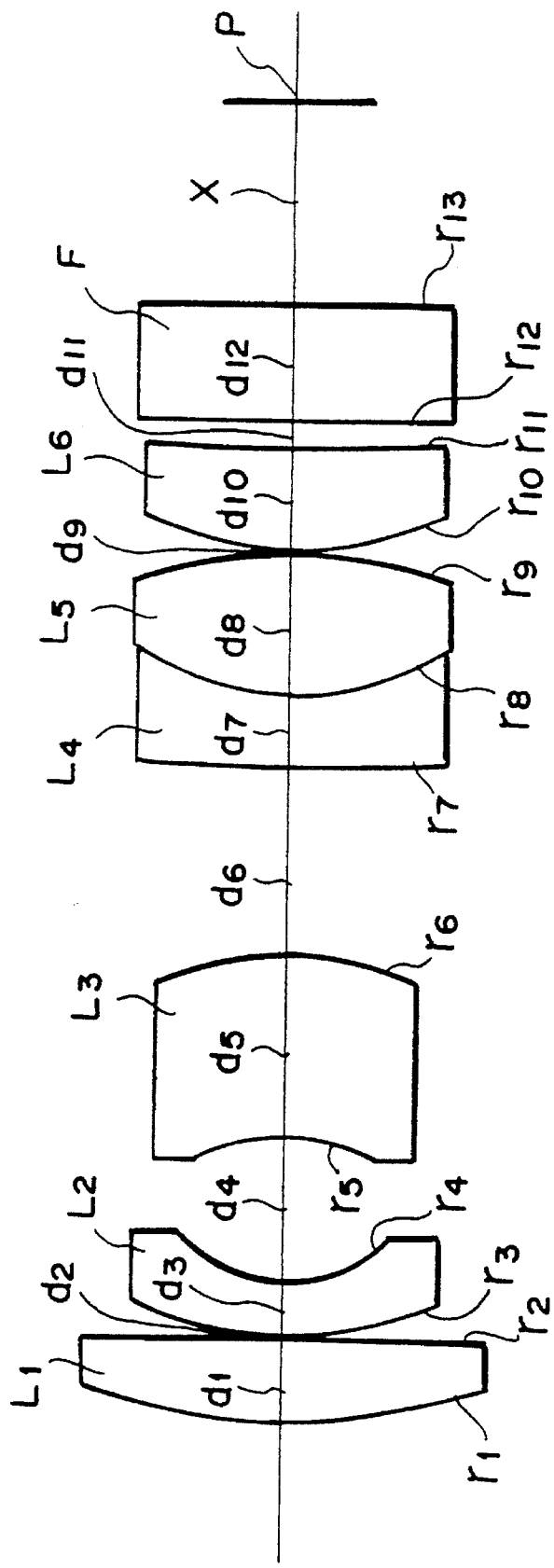
FIG. 1 is a schematic view showing a large aperture retrofocus lens system in accordance with a first embodiment of the present invention.

FIGS. 1 to 4 respectively show large aperture retrofocus lens systems in accordance with first to fourth embodiments of the present invention. As shown in FIGS. 1 to 4, each of the retrofocus lens systems comprises six lenses $L_1$ to $L_6$ and light which enters the lens from an object in parallel to the optical axis X travels through the lens and a lowpass filter F and is focused on a CCD at an imaging position P. The lowpass filter F is formed of a quartz plate.

In each embodiment, the first lens $L_1$ is a positive meniscus lens convex toward the object side, the second lens $L_2$ is a negative meniscus lens convex toward the object side, the third lens $L_3$ is a negative (positive in the second embodiment) meniscus lens convex toward the image plane, the fourth lens $L_4$ is a negative meniscus lens convex toward the object side (a double-concave lens having the face of greater curvature faced to the image plane side in the second embodiment), the fifth lens $L_5$ is a double-convex lens having the face of greater curvature faced to the object side and the sixth lens $L_6$ is a positive meniscus lens convex toward the object side.

Each of the retrofocus lens systems satisfies the following conditions.

$$-5.0f \leq r_5 \leq -0.3f \quad (1)$$

$$-0.75 \leq f/f_3 \leq 0.5 \quad (2)$$

wherein $r_5$ represents the radius of curvature of the object side surface of the third lens ($r_5 < 0$), $f_3$ represents the focal length of the third lens, and f represents the focal length of the overall lens system.

$$30 > v_4 \quad (3)$$

$$42 < (v_5 + v_6)/2 \quad (4)$$

$$1.65 < (n_5 + n_6)/2 \quad (5)$$

wherein $n_i$ represents the refractive index of the i-th lens and $v_i$ represents the Abbe's number of the i-th lens.

Each of the first to fourth embodiments will be described in more detail, hereinbelow.

First Embodiment

The radii of curvature r(mm) of the refracting surfaces, the axial surface separations d (mm) (the central thicknesses of the lenses or the air separations), the refractive indexes $n_d$ for the sodium d-line of the lenses and the Abbe's numbers vd of the lenses of the retrofocus lens system shown in FIG. 1 are as shown in table 1. In table 1 and tables 2 to 4 to be described later, the radii of curvature of the refracting surfaces, the axial surface separations, the refractive indexes for the sodium d-line and the Abbe's numbers of the lenses $L_1$ to $L_6$ and the lowpass filter F are designated in order from the object side at $r_1$ to $r_{13}$, $d_1$ to $d_{12}$, $n_1$ to $n_7$ and $v_1$ to $v_7$.

TABLE 1

| radius of curvature r | axial surface separation d | refracting index $n_d$ | Abbe's number $v_d$ |
|---|---|---|---|
| $r_1 = 20.378$ | $d_1 = 2.85$ | $n_1 = 1.75500$ | $v_1 = 44.7$ |
| $r_2 = 5594.112$ | $d_2 = 0.18$ | | |
| $r_3 = 13.877$ | $d_3 = 1.71$ | $n_2 = 1.49000$ | $v_2 = 64.9$ |
| $r_4 = 5.021$ | $d_4 = 5.03$ | | |
| $r_5 = -6.338$ | $d_5 = 6.22$ | $n_3 = 1.71300$ | $v_3 = 54.3$ |
| $r_6 = -10.120$ | $d_6 = 6.58$ | | |
| $r_7 = 80.292$ | $d_7 = 2.50$ | $n_4 = 1.80518$ | $v_4 = 25.5$ |
| $r_8 = 9.806$ | $d_8 = 4.81$ | $n_5 = 1.71298$ | $v_5 = 54.3$ |
| $r_9 = -16.935$ | $d_9 = 0.15$ | | |
| $r_{10} = 12.271$ | $d_{10} = 3.50$ | $n_6 = 1.71300$ | $v_6 = 54.3$ |
| $r_{11} = 67.431$ | $d_{11} = 1.00$ | | |
| $r_{12} = \infty$ | $d_{12} = 4.00$ | $n_7 = 1.51680$ | $v_7 = 64.2$ |
| $r_{13} = \infty$ | | | |

The back focus Bf (the distance between the image plane side surface of the sixth lens $L_6$ and the image plane as measured along the optical axis X.) of the retrofocus lens system of this embodiment is about 1.28f with the lowpass filter F converted to air. The focal length of the overall lens system is 8.24mm. The f-number of the lens system is 1.24.

Second Embodiment

The radii of curvature r(mm) of the refracting surfaces, the axial surface separations d (mm) (the central thicknesses of the lenses or the air separations), the refractive indexes $n_d$ for the sodium d-line of the lenses and the Abbe's numbers vd of the lenses of the retrofocus lens system shown in FIG. 2 are as shown in table 2.

TABLE 2

| radius of curvature r | axial surface separation d | refracting index $n_d$ | Abbe's number $v_d$ |
|---|---|---|---|
| $r_1 = 15.566$ | $d_1 = 4.76$ | $n_1 = 1.80000$ | $v_1 = 25.0$ |
| $r_2 = 70.744$ | $d_2 = 0.50$ | | |
| $r_3 = 42.143$ | $d_3 = 2.00$ | $n_2 = 1.80000$ | $v_2 = 32.9$ |
| $r_4 = 4.724$ | $d_4 = 8.22$ | | |
| $r_5 = -33.150$ | $d_5 = 3.84$ | $n_3 = 1.77557$ | $v_3 = 49.0$ |
| $r_6 = -10.018$ | $d_6 = 7.69$ | | |
| $r_7 = -132.310$ | $d_7 = 0.80$ | $n_4 = 1.84666$ | $v_4 = 23.8$ |
| $r_8 = 8.996$ | $d_8 = 4.37$ | $n_5 = 1.79992$ | $v_5 = 46.7$ |
| $r_9 = -19.934$ | $d_9 = 0.15$ | | |
| $r_{10} = 12.980$ | $d_{10} = 3.12$ | $n_6 = 1.80000$ | $v_6 = 46.6$ |
| $r_{11} = 43.657$ | $d_{11} = 1.00$ | | |
| $r_{12} = \infty$ | $d_{12} = 4.00$ | $n_7 = 1.51680$ | $v_7 = 64.2$ |
| $r_{13} = \infty$ | | | |

The back focus Bf of the retrofocus lens system of this embodiment is about 1.20f with the lowpass filter F converted to air. The focal length of the overall lens system is 7.77mm. The f-number of the lens system is 1.24.

Third Embodiment

The radii of curvature r(mm) of the refracting surfaces, the axial surface separations d (mm) (the central thicknesses of the lenses or the air separations), the refractive indexes $n_d$ for the sodium d-line of the lenses and the Abbe's numbers vd of the lenses of the retrofocus lens system shown in FIG. 3 are as shown in table 3.

TABLE 3

| radius of curvature r | axial surface separation d | refracting index $n_d$ | Abbe's number $v_d$ |
|---|---|---|---|
| $r_1 = 7.799$ | $d_1 = 5.17$ | $n_1 = 1.52000$ | $v_1 = 63.5$ |
| $r_2 = 40.172$ | $d_2 = 0.50$ | | |
| $r_3 = 15.059$ | $d_3 = 0.80$ | $n_2 = 1.63251$ | $v_2 = 58.4$ |
| $r_4 = 3.496$ | $d_4 = 4.46$ | | |
| $r_5 = -3.175$ | $d_5 = 1.39$ | $n_3 = 1.52000$ | $v_3 = 63.5$ |
| $r_6 = -3.760$ | $d_6 = 4.61$ | | |
| $r_7 = 26.869$ | $d_7 = 2.50$ | $n_4 = 1.84666$ | $v_4 = 23.8$ |
| $r_8 = 7.869$ | $d_8 = 4.67$ | $n_5 = 1.68710$ | $v_5 = 55.6$ |
| $r_9 = -11.422$ | $d_9 = 0.15$ | | |
| $r_{10} = 11.139$ | $d_{10} = 1.84$ | $n_6 = 1.68869$ | $v_6 = 55.5$ |
| $r_{11} = 73.740$ | $d_{11} = 1.00$ | | |
| $r_{12} = \infty$ | $d_{12} = 4.00$ | $n_7 = 1.51680$ | $v_7 = 64.2$ |
| $r_{13} = \infty$ | | | |

The back focus Bf of the retrofocus lens system of this embodiment is about 1.13f with the lowpass filter F converted to air. The focal length of the overall lens system is 8.23 mm, The f-number of the lens system is 1.24.

Fourth Embodiment

The radii of curvature r(mm) of the refracting surfaces, the axial surface separations d (mm) (the central thicknesses of the lenses or the air separations), the refractive indexes $n_d$ for the sodium d-line of the lenses and the Abbe's numbers vd of the lenses of the retrofocus lens system shown in FIG. 4 are as shown in table 4.

TABLE 4

| radius of curvature r | axial surface separation d | refracting index $n_d$ | Abbe's number $v_d$ |
|---|---|---|---|
| $r_1 = 15.817$ | $d_1 = 3.51$ | $n_1 = 1.80000$ | $v_1 = 46.6$ |
| $r_2 = 1013.893$ | $d_2 = 0.15$ | | |
| $r_3 = 7.348$ | $d_3 = 1.67$ | $n_2 = 1.49739$ | $v_2 = 64.5$ |
| $r_4 = 3.667$ | $d_4 = 2.59$ | | |
| $r_5 = -7.654$ | $d_5 = 4.99$ | $n_3 = 1.80000$ | $v_3 = 41.8$ |
| $r_6 = -32.121$ | $d_6 = 5.09$ | | |
| $r_7 = 47.373$ | $d_7 = 2.50$ | $n_4 = 1.84666$ | $v_4 = 23.8$ |
| $r_8 = 8.532$ | $d_8 = 5.09$ | $n_5 = 1.70630$ | $v_5 = 54.6$ |
| $r_9 = -11.638$ | $d_9 = 0.15$ | | |
| $r_{10} = 11.689$ | $d_{10} = 3.50$ | $n_6 = 1.80000$ | $v_6 = 46.6$ |
| $r_{11} = 92.079$ | $d_{11} = 1.00$ | | |
| $r_{12} = \infty$ | $d_{12} = 4.00$ | $n_7 = 1.51680$ | $v_7 = 64.2$ |
| $r_{13} = \infty$ | | | |

The back focus Bf of the retrofocus lens system of this embodiment is about 1.13f with the lowpass filter F converted to air. The focal length of the overall lens system is 8.24 mm. The f-number of the lens system is 1.24.

FIGS. 5 (5A to 5C) to 8 (SA to 8C) respectively show spherical aberration, astigmatism and distortion of the retrofocus lens systems of the first to fourth embodiments.

As can be understood from FIGS. 5 (5A to 5C) to 8 (SA to 8C), the large aperture retrofocus lens systems of the first to fourth embodiments are all about 1.2 in f-number and about 1.1f in back focus and at the same time excellent in aberrations.

The arrangement of the retrofocus lens system in accordance with the present invention need not be limited to those described above in conjunction with the first to fourth embodiments, but the radius of curvature of each lens element, the axial surface separations d and the like may be variously modified without departing from the spirit and scope of the invention.

Further the large aperture retrofocus lens system may be used as the taking lens for various image pickup devices besides video cameras and still-video cameras.

As can be understood from the description above, the retrofocus lens systems of the present invention can meet various requirements to the lens to be mounted on a miniature image pickup device having a solid state image pickup element, that is, to be a clear lens, to have a long back focus,.to be small in size and to be simple in structure.

What is claimed is:

1. A large aperture retrofocus lens system consisting of: a first lens $L_1$ having a positive refracting power, a second lens $L_2$ having a negative refracting power, a third lens $L_3$ which is a meniscus lens concave toward the object side, a fourth lens $L_4$ having a negative refracting power, a fifth lens $L_5$ having a positive refracting power and a sixth lens $L_6$ having a positive refracting power, the first to sixth lenses being arranged in this order from the object side.

2. A large aperture retrofocus lens system as defined in claim 1 which satisfies the following formulae, $$30 > v_4 \quad (3)$$

$$42 < (v_5 + v_6)/2 \quad (4)$$

$$1.65 < (n_5 + n_6)/2 \quad (5)$$

wherein $n_i$ represents the refractive index of the i-th lens and $v_i$ represents the Abbe's number of the i-th lens.

3. A large aperture retrofocus lens system as defined in claim 1 which satisfies the following formulae, $$-5.0f \leq r_5 \leq -0.3f \quad (1)$$

$$-0.75 \leq f/f_3 \leq 0.5 \quad (2)$$

wherein $r_5$ represents the radius of curvature of the object side surface of the third lens ($r_5 < 0$), $f_3$ represents the focal length of the third lens, and f represents the focal length of the overall lens system.

4. A large aperture retrofocus lens system as defined in claim 3 which satisfies the following formulae, $$30 > v_4 \quad (3)$$

$$42 < (v_5 + v_6)/2 \quad (4)$$

$$1.65 < (n_5 + n_6)/2 \quad (5)$$

wherein $n_i$ represents the refractive index of the i-th lens and $v_i$ represents the Abbe's number of the i-th lens.

5. A large aperture retrofocus lens system comprising a first lens $L_1$ which is a positive meniscus lens convex toward the object side, a second lens $L_2$ which is a negative meniscus lens convex toward the object side, a third lens $L_3$ which is a negative meniscus lens convex toward the image plane, a fourth lens $L_4$ which is a negative meniscus lens convex toward the object side, a fifth lens $L_5$ which is a positive refracting power double-convex lens having the face of greater curvature faced to the object side and a sixth lens $L_6$ which is a positive meniscus lens convex toward the object side, the first to sixth lenses being arranged in this order from the object side;

wherein the lens system satisfies the following formulae, $$-5.0f \leq r_5 \leq -0.3f \quad (1)$$

$$-0.75 \leq f/f_3 \leq 0.5 \quad (2)$$

$$30 > v_4 \quad (3)$$

$$42 < (v_5 + v_6)/2 \quad (4)$$

$$1.65 < (n_5 + n_6)/2 \quad (5)$$

where $n_i$ represents the refractive index of the i-th lens, $r_5$ represents the radius of curvature of the object side surface of the third lens ($r_5<0$), $f_3$ represents the focal length of the third lens, f represents the focal length of the overall lens system, and $v_i$, represents the Abbe's number of the i-th lens.

6. A large aperture retrofocus lens system as defined in claim 5 wherein the following conditions are satisfied,

| radius of curvature r | axial surface separation d | refracting index $n_d$ | Abbe's number $v_d$ |
|---|---|---|---|
| $r_1 = 20.378$ | $d_1 = 2.85$ | $n_1 = 1.75500$ | $v_1 = 44.7$ |
| $r_2 = 5594.112$ | $d_2 = 0.18$ | | |
| $r_3 = 13.877$ | $d_3 = 1.71$ | $n_2 = 1.49000$ | $v_2 = 64.9$ |
| $r_4 = 5.021$ | $d_4 = 5.03$ | | |
| $r_5 = -6.338$ | $d_5 = 6.22$ | $n_3 = 1.71300$ | $v_3 = 54.3$ |
| $r_6 = -10.120$ | $d_6 = 6.58$ | | |
| $r_7 = 80.292$ | $d_7 = 2.50$ | $n_4 = 1.80518$ | $v_4 = 25.5$ |
| $r_8 = 9.806$ | $d_8 = 4.81$ | $n_5 = 1.71298$ | $v_5 = 54.3$ |
| $r_9 = -16.935$ | $d_9 = 0.15$ | | |
| $r_{10} = 12.271$ | $d_{10} = 3.50$ | $n_6 = 1.71300$ | $v_6 = 54.3$ |
| $r_{11} = 67.431$ | $d_{11} = 1.00$ | | |
| $r_{12} = \infty$ | $d_{12} = 4.00$ | $n_7 = 1.51680$ | $v_7 = 64.2$ |
| $r_{13} = \infty$ | | | | where the radii of curvature of the refracting surfaces, the axial surface separations, the refractive indexes for the sodium d-line and the Abbe's numbers of the lenses $L_1$ to $L_6$ and the lowpass filter F are designated in order from the object side at $r_1$ to $r_{13}$, $d_1$ to $d_{12}$, $n_1$ to $n_7$ and $v_1$ to $v_7$.

7. A large aperture retrofocus lens system as defined in claim 5 wherein the following conditions are satisfied,

| radius of curvature r | axial surface separation d | refracting index $n_d$ | Abbe's number $v_d$ |
|---|---|---|---|
| $r_1 = 7.799$ | $d_1 = 5.17$ | $n_1 = 1.52000$ | $v_1 = 63.5$ |
| $r_2 = 40.172$ | $d_2 = 0.50$ | | |
| $r_3 = 15.059$ | $d_3 = 0.80$ | $n_2 = 1.63251$ | $v_2 = 58.4$ |
| $r_4 = 3.496$ | $d_4 = 4.46$ | | |
| $r_5 = -3.175$ | $d_5 = 1.39$ | $n_3 = 1.52000$ | $v_3 = 63.5$ |
| $r_6 = -3.760$ | $d_6 = 4.61$ | | |
| $r_7 = 26.869$ | $d_7 = 2.50$ | $n_4 = 1.84666$ | $v_4 = 23.8$ |
| $r_8 = 7.869$ | $d_8 = 4.67$ | $n_5 = 1.68710$ | $v_5 = 55.6$ |
| $r_9 = -11.422$ | $d_9 = 0.15$ | | |
| $r_{10} = 11.139$ | $d_{10} = 1.84$ | $n_6 = 1.68869$ | $v_6 = 55.5$ |
| $r_{11} = 73.740$ | $d_{11} = 1.00$ | | |
| $r_{12} = \infty$ | $d_{12} = 4.00$ | $n_7 = 1.51680$ | $v_7 = 64.2$ |
| $r_{13} = \infty$ | | | | where the radii of curvature of the refracting surfaces, the axial surface separations, the refractive indexes for the sodium d-line and the Abbe's numbers of the lenses $L_1$ to $L_6$ and the lowpass filter F are designated in order from the object side at $r_1$ to $r_{13}$, $d_1$ to $d_{12}$, $n_1$ to $n_7$ and $v_1$ to $v_7$.

8. A large aperture retrofocus lens system as defined in claim 5 wherein the following conditions are satisfied,

| radius of curvature r | axial surface separation d | refracting index $n_d$ | Abbe's number $v_d$ |
|---|---|---|---|
| $r_1 = 15.817$ | $d_1 = 3.51$ | $n_1 = 1.80000$ | $v_1 = 46.6$ |
| $r_2 = 1013.893$ | $d_2 = 0.15$ | | |
| $r_3 = 7.348$ | $d_3 = 1.67$ | $n_2 = 1.49739$ | $v_2 = 64.5$ |
| $r_4 = 3.667$ | $d_4 = 2.59$ | | |
| $r_5 = -7.654$ | $d_5 = 4.99$ | $n_3 = 1.80000$ | $v_3 = 41.8$ |
| $r_6 = -32.121$ | $d_6 = 5.09$ | | |
| $r_7 = 47.373$ | $d_7 = 2.50$ | $n_4 = 1.84666$ | $v_4 = 23.8$ |
| $r_8 = 8.532$ | $d_8 = 5.09$ | $n_5 = 1.70630$ | $v_5 = 54.6$ |
| $r_9 = -11.638$ | $d_9 = 0.15$ | | |
| $r_{10} = 11.689$ | $d_{10} = 3.50$ | $n_6 = 1.80000$ | $v_6 = 46.6$ |
| $r_{11} = 92.079$ | $d_{11} = 1.00$ | | |

-continued

| radius of curvature r | axial surface separation d | refracting index $n_d$ | Abbe's number $v_d$ |
|---|---|---|---|
| $r_{12} = \infty$ | $d_{12} = 4.00$ | $n_7 = 1.51680$ | $v_7 = 64.2$ |
| $r_{13} = \infty$ | | | | where the radii of curvature of the refracting surfaces, the axial surface separations, the refractive indexes for the sodium d-line and the Abbe's numbers of the lenses $L_1$ to $L_6$ and the lowpass filter F are designated in order from the object side at $r_1$ to $r_{13}$, $d_1$ to $d_{12}$, $n_1$ to $n_7$ and $v_1$ to $v_7$.

9. A large aperture retrofocus lens system comprising a first lens $L_1$ which is a positive meniscus lens convex toward the object side, a second lens $L_2$ which is a negative meniscus lens convex toward the object side, a third lens $L_3$ which is a positive meniscus lens convex toward the image plane, a fourth lens $L_4$ which is a double-concave lens of negative refracting power having the face of greater curvature faced to the image plane side, a fifth lens $L_5$ which is a double-convex lens of positive refracting power having the face of greater curvature faced to the object side and a sixth lens $L_6$ which is a positive meniscus lens convex toward the object side, the first to sixth lenses being arranged in this order from the object side;

wherein the lens system satisfies the following formulae, $$-5.0f \leq r_5 \leq -0.3f \quad (1)$$

$$-0.75 \leq f/f_3 \leq 0.5 \quad (2)$$

$$30 > v_4 \quad (3)$$

$$42 < (v_5 + v_6)/2 \quad (4)$$

$$1.65 < (n_5 + n_6)/2 \quad (5)$$

where $n_i$ represents the refractive index of the i-th lens, $r_5$ represents the radius of curvature of the object side surface of the third lens ($r_5<0$), $f_3$ represents the focal length of the third lens, f represents the focal length of the overall lens system, and $v_i$ represents the Abbe's number of the i-th lens.

10. A large aperture retrofocus lens system as defined in claim 9 wherein the following conditions are satisfied,

| radius of curvature r | axial surface separation d | refracting index $n_d$ | Abbe's number $v_d$ |
|---|---|---|---|
| $r_1 = 15.566$ | $d_1 = 4.76$ | $n_1 = 1.80000$ | $v_1 = 25.0$ |
| $r_2 = 70.744$ | $d_2 = 0.50$ | | |
| $r_3 = 42.143$ | $d_3 = 2.00$ | $n_2 = 1.80000$ | $v_2 = 32.9$ |
| $r_4 = 4.724$ | $d_4 = 8.22$ | | |
| $r_5 = -33.150$ | $d_5 = 3.84$ | $n_3 = 1.77557$ | $v_3 = 49.0$ |
| $r_6 = -10.018$ | $d_6 = 7.69$ | | |
| $r_7 = -132.310$ | $d_7 = 0.80$ | $n_4 = 1.84666$ | $v_4 = 23.8$ |
| $r_8 = 8.996$ | $d_8 = 4.37$ | $n_5 = 1.79992$ | $v_5 = 46.7$ |
| $r_9 = -19.934$ | $d_9 = 0.15$ | | |
| $r_{10} = 12.980$ | $d_{10} = 3.12$ | $n_6 = 1.80000$ | $v_6 = 46.6$ |
| $r_{11} = 43.657$ | $d_{11} = 1.00$ | | |
| $r_{12} = \infty$ | $d_{12} = 4.00$ | $n_7 = 1.51680$ | $v_7 = 64.2$ |
| $r_{13} = \infty$ | | | | where the radii of curvature of the refracting surfaces, the axial surface separations, the refractive indexes for the sodium d-line and the Abbe's numbers of the lenses $L_1$ to $L_6$ and the lowpass filter F are designated in order from the object side at $r_1$ to $r_{13}$, $d_1$ to $d_{12}$, $n_1$ to $n_7$ and $v_1$ to $v_7$.

* * * * *